(12) United States Patent
Takeda

(10) Patent No.: US 10,818,962 B2
(45) Date of Patent: Oct. 27, 2020

(54) NEGATIVE ELECTRODE, LITHIUM ION SECONDARY BATTERY, METHOD OF MANUFACTURING NEGATIVE ELECTRODE, AND METHOD OF MANUFACTURING LITHIUM ION SECONDARY BATTERY

(71) Applicant: TOYOTA JIDOSHA KABUSHIKI KAISHA, Toyota-shi, Aichi-ken (JP)

(72) Inventor: Kazuhisa Takeda, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 155 days.

(21) Appl. No.: 16/106,710

(22) Filed: Aug. 21, 2018

(65) Prior Publication Data

US 2019/0081348 A1 Mar. 14, 2019

(30) Foreign Application Priority Data

Sep. 11, 2017 (JP) ................................ 2017-174151

(51) Int. Cl.
*H01M 2/08* (2006.01)
*H01M 2/14* (2006.01)
(Continued)

(52) U.S. Cl.
CPC ......... *H01M 10/0525* (2013.01); *H01M 2/08* (2013.01); *H01M 2/145* (2013.01); *H01M 4/0404* (2013.01); *H01M 4/366* (2013.01); *H01M 4/485* (2013.01); *H01M 4/62* (2013.01); *H01M 4/623* (2013.01); *H01M 4/661* (2013.01); *H01M 10/058* (2013.01); *H01M 2004/021* (2013.01); *H01M 2004/027* (2013.01); *H01M 2004/028* (2013.01)

(58) Field of Classification Search
CPC .... H01M 4/0404; H01M 4/362; H01M 4/366; H01M 4/485; H01M 4/62; H01M 4/623; H01M 4/661; H01M 2004/021; H01M 2004/027; H01M 2004/028; H01M 10/0525; H01M 10/058
See application file for complete search history.

(56) References Cited

U.S. PATENT DOCUMENTS

2012/0258360 A1\* 10/2012 Ogihara ................ H01M 4/137
429/213

FOREIGN PATENT DOCUMENTS

JP 2015-046219 \* 3/2015
JP 2015-046219 A 3/2015
(Continued)

*Primary Examiner* — Brittany L Raymond
(74) *Attorney, Agent, or Firm* — Sughrue Mion, PLLC

(57) ABSTRACT

A negative electrode contains at least composite particles. The composite particles each contain a negative electrode active material particle and a coating. The coating is formed on a surface of the negative electrode active material particle. The coating contains at least a metal organic framework. The metal organic framework is formed by alternately stacking a first layer and a second layer. The first layer is formed by stacking an aromatic compound in a direction intersecting with a direction of stack of the first layer and the second layer. The aromatic compound contains two carboxylate anions. The two carboxylate anions satisfy para-positional relation. The second layer is formed of lithium ions coordinated to the carboxylate anion.

4 Claims, 6 Drawing Sheets

(51) Int. Cl.
*H01M 4/36* (2006.01)
*H01M 4/485* (2010.01)
*H01M 4/62* (2006.01)
*H01M 4/66* (2006.01)
*H01M 10/0525* (2010.01)
*H01M 10/058* (2010.01)
*H01M 4/04* (2006.01)
*H01M 4/02* (2006.01)

(56) References Cited

FOREIGN PATENT DOCUMENTS

| | | |
|---|---|---|
| JP | 2016-167355 A | 9/2016 |
| JP | 2017-022186 A | 1/2017 |

\* cited by examiner

NEGATIVE ELECTRODE, LITHIUM ION SECONDARY BATTERY, METHOD OF MANUFACTURING NEGATIVE ELECTRODE, AND METHOD OF MANUFACTURING LITHIUM ION SECONDARY BATTERY

This nonprovisional application is based on Japanese Patent Application No. 2017-174151 filed with the Japan Patent Office on Sep. 11, 2017, the entire contents of which are hereby incorporated by reference.

BACKGROUND

Field

The present disclosure relates to a negative electrode, a lithium ion secondary battery, a method of manufacturing a negative electrode, and a method of manufacturing a lithium ion secondary battery.

Description of the Background Art

Japanese Patent Laying-Open No. 2017-022186 discloses a metal organic framework (MOF) with specific crystal structure.

SUMMARY

According to Japanese Patent Laying-Open No. 2017-022186, the MOF is capable of occlusion and release of lithium (Li) ions, and an electrical resistance thereof abruptly increases when an amount of occluded Li ions is equal to or smaller than a prescribed amount.

The MOF in Japanese Patent Laying-Open No. 2017-022186 may be mixed in a negative electrode of a lithium ion secondary battery (which may be abbreviated as a "battery" below). According to this feature, it is expected that when a positive electrode and the negative electrode are short-circuited to each other, an electrical resistance of the negative electrode abruptly increases and propagation of a short-circuit current is suppressed. The MOF is thus expected to function like a fuse.

In general, however, negative electrode active material particles (for example, graphite) contained in the negative electrode are excellent in electron conductivity. Therefore, a short-circuit current may propagate through a point of contact between negative electrode active material particles.

An object of the present disclosure is to suppress propagation of a short-circuit current.

Technical features and functions and effects of the present disclosure will be described below. A functional mechanism of the present disclosure, however, includes presumption. The scope of claims for patent should not be limited by whether or not the functional mechanism is correct.

[1] A negative electrode contains at least composite particles. The composite particles each contain a negative electrode active material particle and a coating. The coating is formed on a surface of the negative electrode active material particle. The coating contains at least a metal organic framework. The metal organic framework is formed by alternately stacking a first layer and a second layer. The first layer is formed by stacking an aromatic compound in a direction intersecting with a direction of stack of the first layer and the second layer. The aromatic compound contains two carboxylate anions. The two carboxylate anions satisfy para-positional relation. The second layer is formed of lithium ions coordinated to the carboxylate anion.

The metal organic framework (which is also simply denoted as an "MOF" below) in the present disclosure is capable of occlusion and release of Li ions and an electrical resistance thereof may abruptly increase when an amount of occluded Li ions is equal to or smaller than a prescribed amount. The MOF is thus expected to abruptly increase in electrical resistance when a positive electrode and a negative electrode are short-circuited to each other.

The negative electrode in the present disclosure contains composite particles. The composite particles each contain a negative electrode active material particle and a coating. The coating is formed on the surface of the negative electrode active material particle. The coating contains the MOF. Therefore, in the negative electrode in the present disclosure, the coating containing the MOF is interposed between the negative electrode active material particles. Since an electrical resistance of the coating increases when the positive electrode and the negative electrode are short-circuited to each other, it is expected that propagation of a short-circuit current through a point of contact between the negative electrode active material particles is suppressed.

[2] The negative electrode may further contain lithium-containing titanium oxide particles.

The MOF is capable of occlusion and release of Li ions. In other words, the MOF can have Li ion conductivity. The MOF, however, is low in electron conductivity. Lithium-containing titanium oxide particles (which may be abbreviated as "LTO particles" below) are higher in electron conductivity than the MOF. The negative electrode further contains the LTO particles so that increase in resistance in normal use can be suppressed.

[3] The coating may further contain the lithium-containing titanium oxide particles.

The coating contains both of the MOF and the LTO particles so that propagation of a short-circuit current can further be suppressed. The coating further contains both of the MOF and the LTO particles so that a resistance in normal use can be lowered.

[4] A lithium ion secondary battery in the present disclosure includes at least the negative electrode described in any one of [1] to [3] and a positive electrode. The lithium ion secondary battery in the present disclosure is expected to achieve suppression of propagation of a short-circuit current when the positive electrode and the negative electrode are short-circuited to each other.

[5] A method of manufacturing a negative electrode in the present disclosure includes [a1] to [a3] below:

[a1] Preparing composite particles by forming a coating on a surface of a negative electrode active material particle;

[a2] Preparing a paste containing at least the composite particles and an organic solvent; and

[a3] Manufacturing a negative electrode by applying the paste to a surface of a negative electrode current collector and drying the paste. The coating is formed to contain a reaction product of aromatic dicarboxylic acid and lithium hydroxide.

According to the manufacturing method, manufacturing of the negative electrode in [1] is expected. In the manufacturing method, an organic solvent is used for a paste. When water is used for the paste, a reaction product of aromatic dicarboxylic acid and lithium hydroxide may come off from the surface of the negative electrode active material particle. Then, it can be difficult to maintain the coating.

[6] In [5], the paste may be prepared to further contain lithium-containing titanium oxide particles. According to the manufacturing method, manufacturing of the negative electrode in [2] is expected.

[7] In [6], the coating may be formed to further contain the lithium-containing titanium oxide particles. According to the manufacturing method, manufacturing of the negative electrode in [3] is expected.

[8] A method of manufacturing a lithium ion secondary battery in the present disclosure includes [A] and [B] below:

[A] Preparing a negative electrode manufactured with the method of manufacturing a negative electrode described in any one of [5] to [7]; and

[B] Manufacturing a lithium ion secondary battery including at least the negative electrode and a positive electrode.

A lithium ion secondary battery manufactured with the manufacturing method is expected to achieve suppression of propagation of a short-circuit current when the positive electrode and the negative electrode are short-circuited to each other.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure (which is herein denoted as the "present embodiment") will be described below. The description below, however, does not limit the scope of claims.

The description herein expressing a numerical range such as "1 to 100" means "not smaller than 1 and not greater than 100" unless otherwise specified.

<Lithium Ion Secondary Battery>

Figure 1:
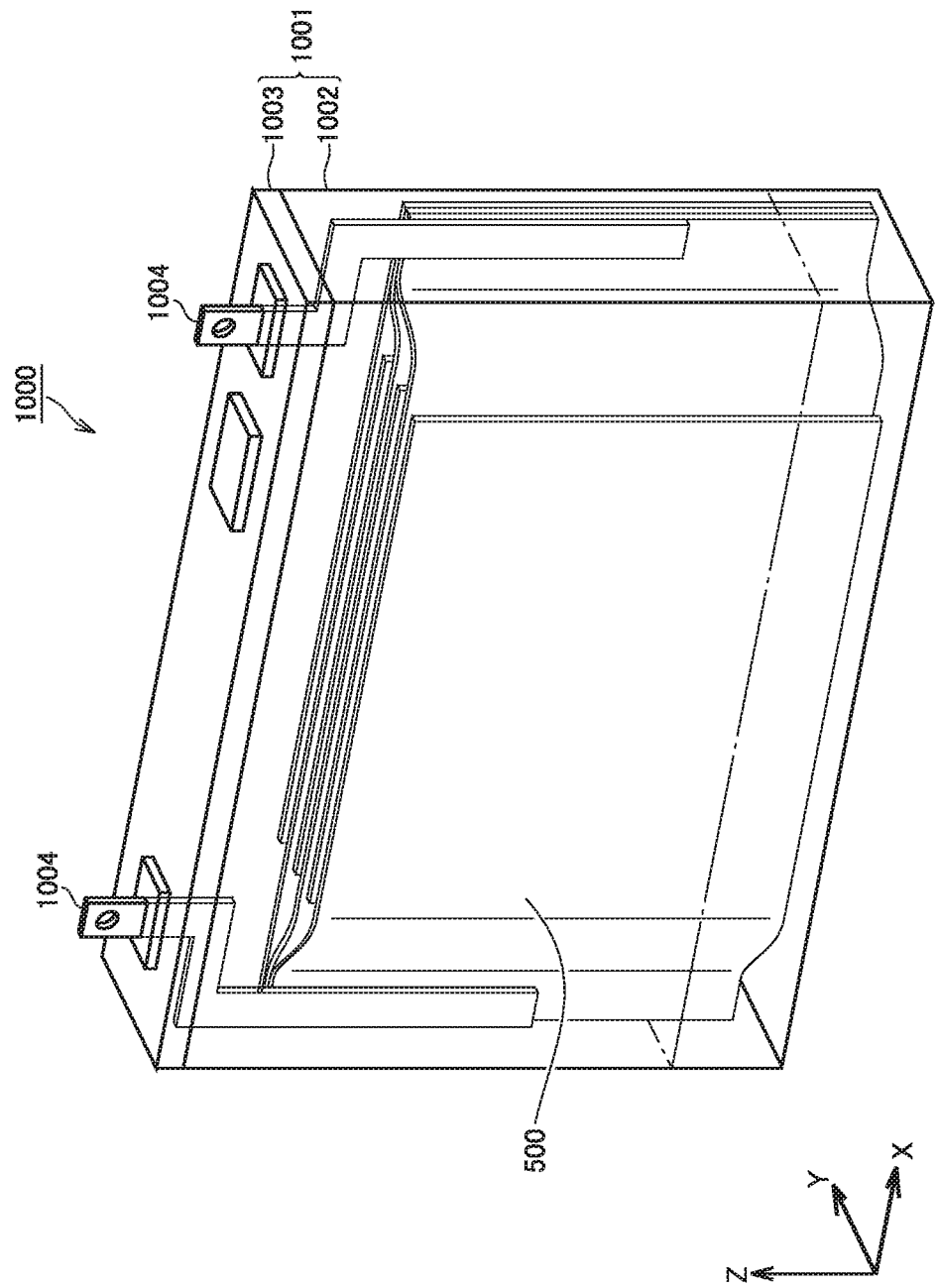
FIG. 1 is a schematic diagram showing one example of a construction of a lithium ion secondary battery in the present embodiment.

FIG. 1 is a schematic diagram showing one example of a construction of a lithium ion secondary battery in the present embodiment. A battery 1000 is in a prismatic shape. The battery in the present embodiment, however, should not be limited to be in the prismatic shape. The battery in the present embodiment may be in a cylindrical shape.

Battery 1000 includes a case 1001. Case 1001 is hermetically sealed. Case 1001 can be made, for example, of a metal. Case 1001 can be made, for example, of an aluminum (Al) alloy. So long as the case can hermetically be sealed, the case may be, for example, a pouch made of an aluminum laminated film. The battery in the present embodiment may be a laminated battery.

Case 1001 includes a container 1002 and a lid 1003. Lid 1003 is joined to container 1002, for example, with laser welding. An external terminal 1004 is provided in lid 1003. Lid 1003 may be provided with a liquid introduction port, a gas exhaust valve, and a current interrupt device (CID).

Case 1001 accommodates an electrode group 500 and an electrolyte solution. Electrode group 500 is electrically connected to external terminal 1004. A chain dotted line in FIG. 1 shows a liquid level of the electrolyte solution. The electrolyte solution is also present in electrode group 500.

Figure 2:
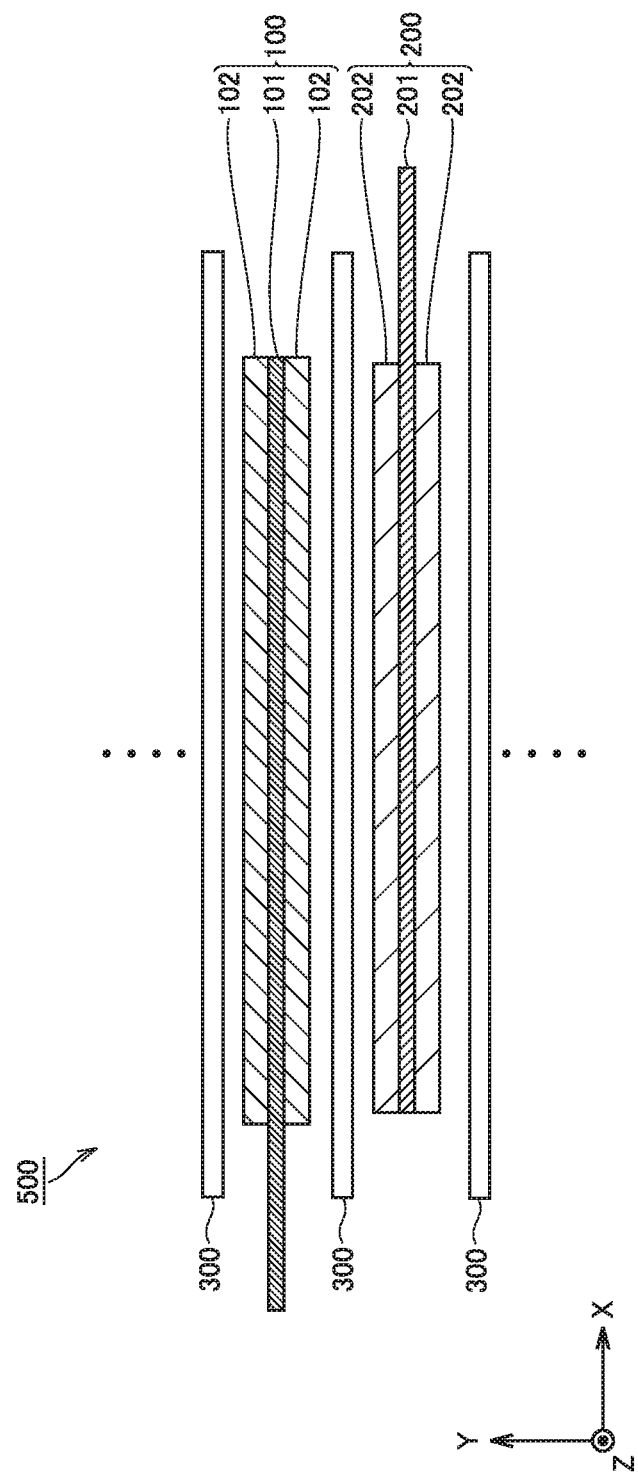
FIG. 2 is a conceptual cross-sectional view showing one example of a construction of an electrode group in the present embodiment.

FIG. 2 is a conceptual cross-sectional view showing one example of a construction of the electrode group in the present embodiment. Electrode group 500 is of a stack type. Electrode group 500 is formed by alternately stacking a positive electrode 100 and a negative electrode 200 with a separator 300 being interposed between positive electrode 100 and negative electrode 200. Battery 1000 includes at least negative electrode 200 and positive electrode 100. Naturally, the electrode group in the present embodiment should not be limited to the stack type. The electrode group in the present embodiment may be a wound type. The wound type electrode group can be formed, for example, by stacking the positive electrode, the separator, the negative electrode, and the separator in this order and helically winding these components.

<<Negative Electrode>>

Negative electrode 200 can be, for example, in a form of a sheet. Negative electrode 200 includes a negative electrode current collector 201 and a negative electrode composite material layer 202. Negative electrode current collector 201 may be, for example, a pure copper (Cu) foil or a Cu alloy foil. Negative electrode current collector 201 may have a thickness, for example, from 5 to 50 μm.

A "thickness" of each feature herein can be measured, for example, with a micrometer. A thickness of each feature may be measured in a cross-sectional electron micrograph (SEM). A thickness is measured at least three times. An arithmetic mean resulting from at least three times of measurement can be adopted as a measurement result.

Negative electrode composite material layer 202 is formed on a surface of negative electrode current collector 201. Negative electrode composite material layer 202 may be formed on both of a front surface and a rear surface of negative electrode current collector 201. Negative electrode composite material layer 202 may have a thickness, for example, from 10 to 200 μm.

(Composite Particles)

Figure 3:
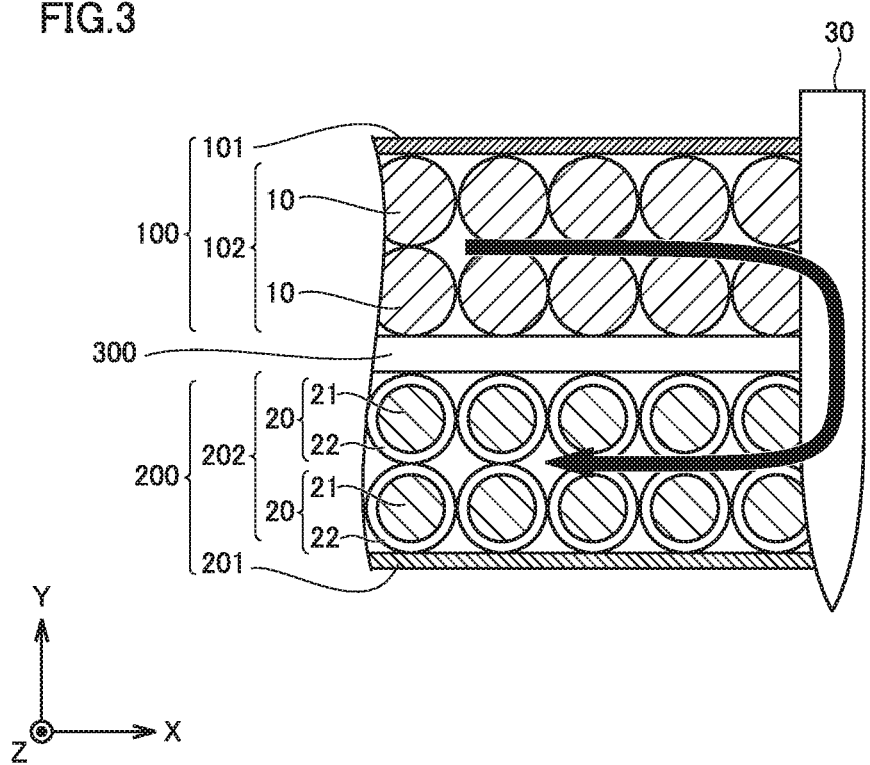
FIG. 3 is a conceptual cross-sectional view for illustrating propagation of a short-circuit current.

FIG. 3 is a conceptual cross-sectional view for illustrating propagation of a short-circuit current. Negative electrode composite material layer 202 contains at least composite particles 20. Namely, negative electrode 200 contains at least composite particles 20. Composite particles 20 each contain a negative electrode active material particle 21 and a coating 22. Coating 22 is formed on a surface of negative electrode active material particle 21.

FIG. 3 shows a conductive foreign matter 30 passing through positive electrode 100, separator 300, and negative electrode 200. Positive electrode 100 and negative electrode 200 are short-circuited to each other through conductive foreign matter 30.

An arrow in FIG. 3 shows a path of propagation of the short-circuit current. The short-circuit current is considered to flow from a positive electrode composite material layer 102 (which will be described later) into conductive foreign matter 30. The short-circuit current is considered to flow further from conductive foreign matter 30 into negative electrode composite material layer 202. The short-circuit current is considered to propagate through negative electrode active material particles 21 in negative electrode composite material layer 202, which may be because of high electron conductivity of negative electrode active material particles 21.

In the present embodiment, coating 22 is formed on the surface of negative electrode active material particle 21. Coating 22 suppresses direct contact between negative electrode active material particles 21. Coating 22 contains the MOF (which will be described later) in the present embodiment. Since Li ions are released from the MOF due to short-circuiting, an electrical resistance of the MOF, that is, coating 22, is expected to abruptly increase. Therefore, suppression of propagation of the short-circuit current through a point of contact between negative electrode active material particles 21 is expected. Suppression of increase in temperature of battery 1000 at the time of short-circuiting is thus expected.

(Negative Electrode Active Material Particles)

Negative electrode composite material layer 202 may contain, for example, 70 to 97 mass % of negative electrode active material particles 21. Negative electrode composite material layer 202 may contain, for example, 93.3 to 95.6 mass % of negative electrode active material particles 21. Negative electrode active material particles 21 electrochemically occlude and release Li ions. A shape of negative electrode active material particle 21 should not particularly be limited. Negative electrode active material particles 21 may be spherical, lumpy, or flaky. Negative electrode active material particles 21 may have an average particle size, for example, from 1 to 30 μm.

The "average particle size" herein can be measured with a laser diffraction/scattering method. The average particle size refers to a particle size at which a cumulative volume of particles from a finer side attains to 50% of the total volume of particles in a volume-based particle size distribution. Such a particle size is also referred to as "d50." An average particle size can be measured at least three times. An arithmetic mean resulting from at least three times of measurement can be adopted as a measurement result.

Negative electrode active material particles 21 may contain, for example, graphite or low-crystalline carbon. Graphite may be natural graphite or artificial graphite. For example, spheroidized natural graphite may be employed for negative electrode active material particles 21. "Spheroidized natural graphite" refers to natural graphite (flake graphite) subjected to spheroidization. "Spheroidization" can be, for example, a treatment for shaping a particle to be closer to a spheroid through friction or pulverization in an air current.

"Low-crystalline carbon" refers to a material including crystal structure (graphite structure) lower in crystallinity than natural graphite in which carbon hexagonal planes are stacked. Low-crystalline carbon may be, for example, soft carbon or hard carbon. Negative electrode active material particles 21 may contain at least one selected from the group consisting of graphite, soft carbon, and hard carbon.

Crystallinity can be evaluated, for example, based on an average spacing in a (002) plane. As the average spacing in the (002) plane is greater, crystallinity can be evaluated as being lower. The average spacing in the (002) plane can be determined with X-ray diffraction (XRD). Natural graphite can have an averaging spacing in the (002) plane, for example, from 0.3354 to 0.3356 nm. Low-crystalline carbon can have an averaging spacing in the (002) plane, for example, from 0.3357 to 0.3400 nm.

Negative electrode active material particles 21 may be composed of a composite material of graphite and low-crystalline carbon. For example, a surface of spheroidized natural graphite may be coated with low-crystalline carbon. In the composite material, a ratio of low-crystalline carbon may be set, for example, to 1 to 10 mass % to a total of spheroidized natural graphite and low-crystalline carbon.

(Coating)

Negative electrode composite material layer 202 may contain, for example, 1 to 10 mass % of coating 22. Negative electrode composite material layer 202 may contain, for example, 2.4 to 4.8 mass % of coating 22. Coating 22 is formed on the surface of negative electrode active material particle 21. The entire surface of negative electrode active material particle 21 may be coated with coating 22. A part of the surface of negative electrode active material particle 21 may be coated with coating 22. Namely, coating 22 is formed on at least a part of the surface of negative electrode active material particle 21. It is considered that coating 22 is formed on at least a part of the surface of negative electrode active material particle 21 so that direct contact between negative electrode active material particles 21 is suppressed.

(MOF)

Coating 22 contains at least the MOF. Coating 22 may consist of the MOF. Coating 22 may further contain a component other than the MOF (for example, LTO particles which will be described later).

Figure 4:
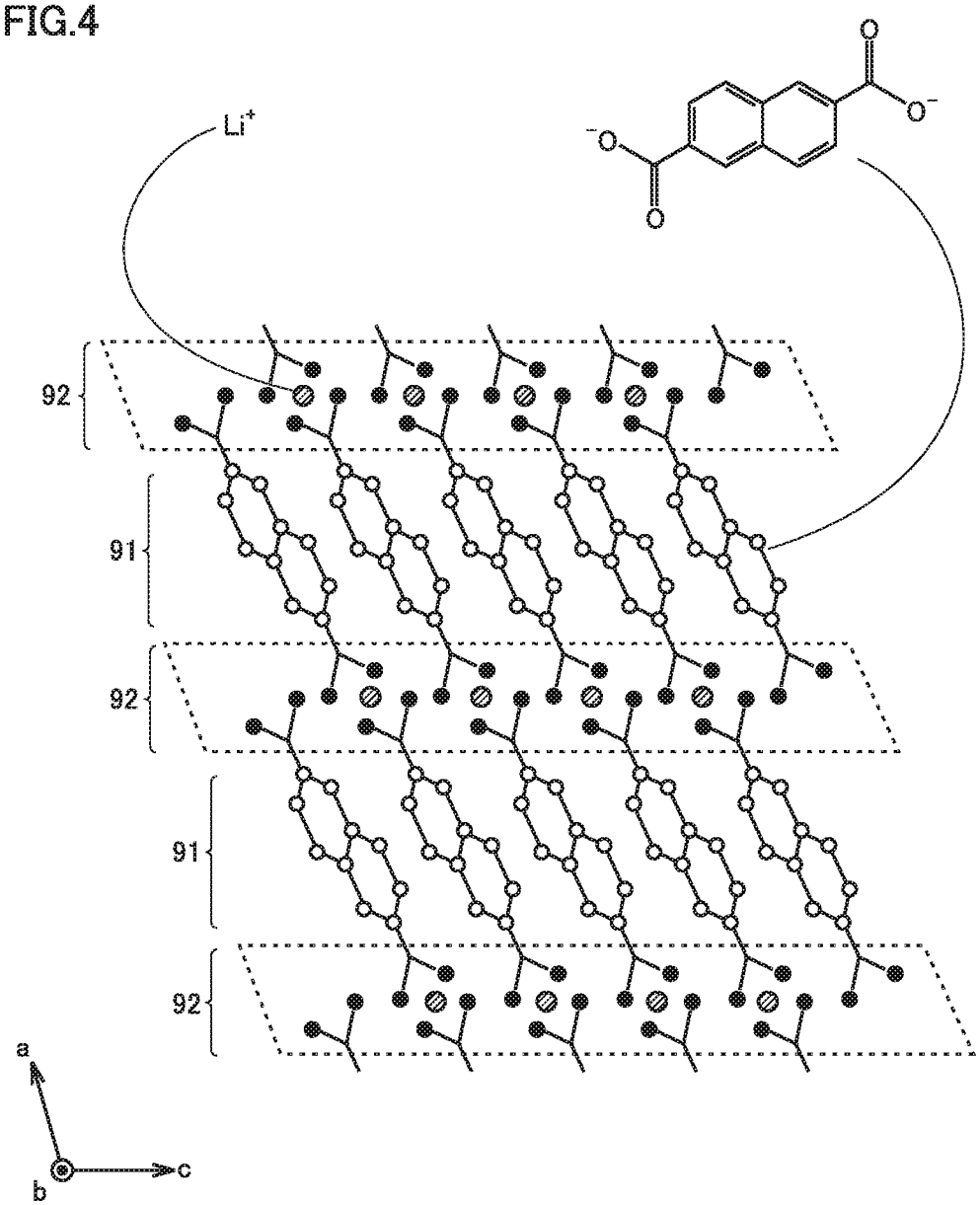
FIG. 4 is a conceptual diagram showing one example of an MOF in the present embodiment.

FIG. 4 is a conceptual diagram showing one example of the MOF in the present embodiment. The MOF can have crystal structure attributed, for example, to a space group $P2_1/c$. The crystal structure of the MOF can be specified, for example, with XRD.

The MOF is formed by alternately stacking a first layer 91 and a second layer 92. First layer 91 is an organic layer so to speak. First layer 91 is formed by stacking an aromatic compound in a direction (a direction of a c axis in FIG. 4) intersecting with a direction of stack (a direction of an a axis in FIG. 4) of first layer 91 and second layer 92. It is considered that π-π stacking interaction is applied between the aromatic compounds in first layer 91. The aromatic compound contains two carboxylate anions ($COO^-$). The two carboxylate anions satisfy para-positional relation.

"Para-positional relation" herein represents a combination of most distant substitution positions among combinations of two substitution positions in a structural formula (a two-dimensionally expressed chemical formula) of an aromatic compound. For example, for a benzene ring, a combination of a first position and a fourth position corresponds to para-positional relation For example, for a naphthalene ring, a combination of a second position and a sixth position corresponds to para-positional relation.

Second layer 92 is a metal layer so to speak. Second layer 92 is formed of Li ions ($Li^+$) coordinated to a carboxylate anion in first layer 91. Second layer 92 is considered to be formed, for example, of a unit composed of $LiO_4$. The MOF is considered to have an Li-ion occlusion site in second layer 92. It is considered that Li ions are occluded in second layer 92 by coordination of Li ions further to oxygen atoms (O) contained in a carboxylate anion.

An electrical resistance of the MOF can abruptly increase when an amount of occluded Li ions is equal to or smaller than a prescribed amount. For example, when positive electrode 100 and negative electrode 200 are short-circuited to each other, Li ions are excessively released from negative electrode 200 and hence the amount of occluded Li ions in the MOF is considered to be equal to or smaller than the prescribed amount. The MOF is considered to abruptly increase in electrical resistance when short-circuiting occurs.

The aromatic compound may be aromatic hydrocarbon. The aromatic compound may be a complex aromatic compound. In the aromatic compound, some or all of hydrogen atoms (H) bonded to an aromatic ring may be substituted. A substituent for an aromatic ring may be, for example, a halogen atom, a hydroxy group, an alkyl group, an aryl group, an alkoxy group, a sulfonyl group, an amino group, or a cyano group. The aromatic compound of which first layer 91 is composed may be, for example, an aromatic compound expressed in any of formulae (I) to (IV) below.

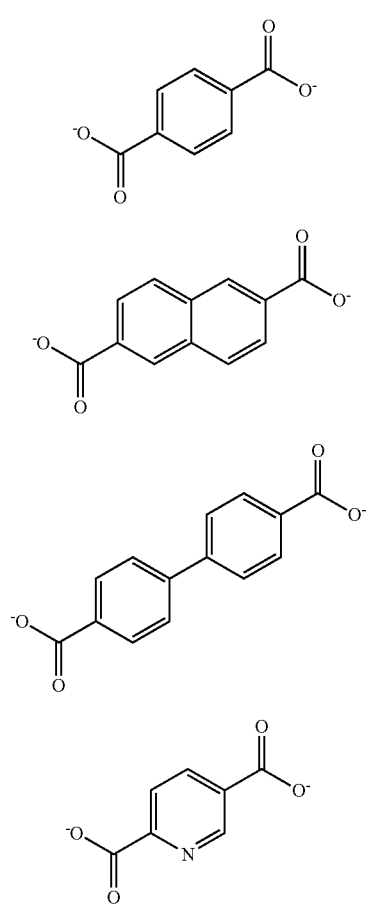

For example, when first layer 91 is composed of the aromatic compound in the formula (II), Li ions are considered to be occluded and released as a result of a reaction in a formula (V) below.

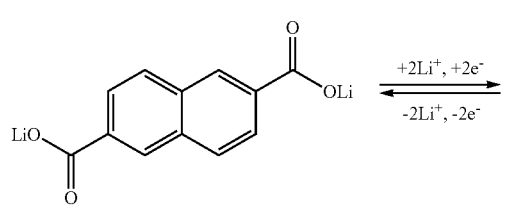

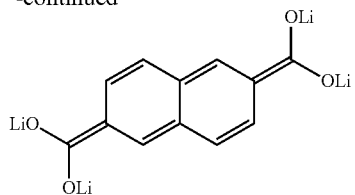

Negative electrode composite material layer 202 may contain, for example, 1 to 10 mass % of MOF. Negative electrode composite material layer 202 may contain, for example, 2.4 to 4.8 mass % of MOF. Within the range, for example, both of a high resistance at the time of short-circuiting and a low resistance in normal use can be expected.

(LTO Particles)

Negative electrode composite material layer 202 may further contain LTO particles. Namely, negative electrode 200 may further contain LTO particles. The LTO particles are higher in electron conductivity than the MOF. Negative electrode 200 further contains LTO particles so that suppression of increase in resistance in normal use is expected.

Negative electrode composite material layer 202 may contain, for example, 1 to 10 mass % of LTO particles. Negative electrode composite material layer 202 may contain, for example, 2.4 to 4.8 mass % in total of MOF and LTO particles. Within the range, for example, both of a high resistance at the time of short-circuiting and a low resistance in normal use can be expected.

The LTO particles may be smaller in average particle size than negative electrode active material particles 21. The LTO particles may have an average particle size, for example, from 0.1 to 1 μm. The LTO particles can have various crystal structures. The LTO particles may have, for example, spinel type crystal structure. The LTO particles may be composed, for example, of $Li_4Ti_5O_{12}$.

The LTO particles may be dispersed in negative electrode composite material layer 202. The LTO particles may be contained in coating 22. Namely, coating 22 may further contain the LTO particles. Coating 22 contains both of the MOF and the LTO particles so that propagation of a short-circuit current can further be suppressed. This may be because an electrical resistance of the LTO particles can also increase at the time of short-circuiting. The coating further contains both of the MOF and the LTO particles so that a resistance in normal use can be lowered.

(Binder)

Negative electrode composite material layer 202 may further contain a binder. The binder binds components in negative electrode composite material layer 202 to each other. Negative electrode composite material layer 202 may contain, for example, 1 to 10 mass % of binder. Negative electrode composite material layer 202 may contain, for example, 1.9 to 2.0 mass % of binder.

The binder may be, for example, an organic solvent based binder. The "organic solvent based binder" herein refers to a binder which can be dissolved in an organic solvent. The organic solvent based binder may be, for example, polyvinylidene difluoride (PVdF), a vinylidene difluoride-hexafluoropropylene copolymer [poly(VDF-co-HFP)], polyimide, or polyamide-imide. One type of binder may be used alone. Two or more types of binders may be used as being combined.

<<Positive Electrode>>

Positive electrode 100 can be, for example, in a form of a sheet. Positive electrode 100 includes a positive electrode current collector 101 and positive electrode composite material layer 102. Positive electrode current collector 101 may be, for example, a pure Al foil or an Al alloy foil. Positive electrode current collector 101 may have a thickness, for example, from 5 to 50 μm.

Positive electrode composite material layer 102 is formed on a surface of positive electrode current collector 101. Positive electrode composite material layer 102 may be formed on both of a front surface and a rear surface of positive electrode current collector 101. Positive electrode composite material layer 102 may contain, for example, 90 to 98 mass % of positive electrode active material particles 10 (FIG. 3), 1 to 5 mass % of conductive material, and 1 to 5 mass % of binder. Positive electrode 100 contains at least positive electrode active material particles 10.

Positive electrode active material particles 10 electrochemically occlude and release Li ions. Positive electrode active material particles 10 may have an average particle size, for example, from 1 to 30 μm. Positive electrode active material particles 10 should not particularly be limited. Positive electrode active material particles 10 may be, for example, $LiCoO_2$, $LiNiO_2$. $LiMnO_2$, $LiMn_2O_4$. $LiNi_{1/3}Co_{1/3}Mn_{1/3}O_2$, $LiNi_{0.8}Co_{0.15}Al_{0.05}O_2$, or $LiFePO_4$. One type of positive electrode active material particles 10 may be used alone. Two or more types of positive electrode active material particles 10 may be used as being combined.

The conductive material assists conduction of electrons in positive electrode composite material layer 102. The conductive material should not particularly be limited. The conductive material may be, for example, acetylene black (AB), Ketjenblack®, vapor-grown carbon fiber (VGCF), carbon nanotube (CNT), or graphite. One type of conductive material may be used alone. Two or more types of conductive materials may be used as being combined.

The binder should not particularly be limited. The binder may be an organic solvent based binder or a water based binder. The "water based binder" herein refers to a binder which can be dissolved or dispersed in water. The water based binder may be, for example, polytetrafluoroethylene (PTFE), carboxymethyl cellulose (CMC), polyacrylic acid (PAA), an ethylene-acrylate copolymer, or styrene-butadiene rubber (SBR). One type of binder may be used alone. Two or more types of binders may be used as being combined.

<<Separator>>

Separator 300 is in a form of a porous sheet. Separator 300 may have a thickness, for example, from 5 to 50 μm. Separator 300 is interposed between positive electrode 100 and negative electrode 200. Separator 300 electrically isolates positive electrode 100 and negative electrode 200 from each other. Separator 300 can be composed of an electrically insulating material. Separator 300 can be composed, for example, of polyethylene (PE) or polypropylene (PP).

Separator 300 may have a single-layered structure. Separator 300 may be formed only of a porous film (a PE layer) composed of PE. Separator 300 may have a multi-layered structure. Separator 300 may be formed, for example, by stacking a porous film (a PP layer) composed of PP, a porous film (a PE layer) composed of PE, and a porous film (a PP layer) composed of PP in this order.

A heat-resistant layer may be formed on a surface of separator 300. The heat-resistant layer may have a thickness, for example, from 1 to 10 μm. The heat-resistant layer contains a heat-resistant material. For example, alumina or polyimide may be employed as the heat-resistant material.

<<Electrolyte Solution>>

An electrolyte solution contains Li salt and a solvent. The electrolyte solution may contain, for example, 0.5 to 2 mol/l of Li salt. The Li salt functions as a supporting electrolyte. The Li salt may be, for example, $LiPF_6$, $LiBF_4$, $Li[N(FSO_2)_2]$, or $Li[N(CF_3SO_2)_2]$. One type of Li salt may be used alone. Two or more types of Li salt may be used as being combined.

The solvent is aprotic. The solvent may be, for example, a mixture of cyclic carbonate and chain carbonate. A ratio of mixing may be set, for example, to "cyclic carbonate:chain carbonate=1:9 to 5:5 (at a volume ratio)."

Cyclic carbonate may be, for example, ethylene carbonate (EC), propylene carbonate (PC), butylene carbonate (BC), or fluoroethylene carbonate (FEC) One type of cyclic carbonate may be used alone. Two or more types of cyclic carbonate may be used as being combined.

Chain carbonate may be, for example, dimethyl carbonate (DMC), ethyl methyl carbonate (EMC), or diethyl carbonate (DEC). One type of chain carbonate may be used alone. Two or more types of chain carbonate may be used as being combined.

The solvent may include, for example, lactone, cyclic ether, chain ether, and carboxylate. Lactone may be, for example, γ-butyrolactone (GBL) or δ-valerolactone. Cyclic ether may be, for example, tetrahydrofuran (THF), 1,3-dioxolane, or 1,4-dioxane. Chain ether may be 1,2-dimethoxyethane (DME). Carboxylate may be, for example, methyl formate (MF), methyl acetate (MA), or methyl propionate (MP).

The electrolyte solution may further contain various functional additives in addition to the Li salt and the solvent. The electrolyte solution may contain, for example, 1 to 5 mass % of functional additive. Examples of the functional additive include a gas generating agent (an overcharge additive) and a solid electrolyte interface (SEI) film forming agent. The gas generating agent may be, for example, cyclohexylbenzene (CHB) or biphenyl (BP). The SEI film forming agent may be, for example, vinylene carbonate (VC), vinyl ethylene carbonate (VEC), $Li[B(C_2O_4)_2]$, $LiPO_2F_2$, propane sultone (PS), or ethylene sulfite (ES).

In the present embodiment, a gel electrolyte or a solid electrolyte may be used instead of the electrolyte solution (a liquid electrolyte). In the present embodiment, the gel electrolyte and the solid electrolyte may be used in addition to the electrolyte solution.

<Method of Manufacturing Lithium Ion Secondary Battery>

A method of manufacturing a lithium ion secondary battery in the present embodiment will be described below.

Figure 5:
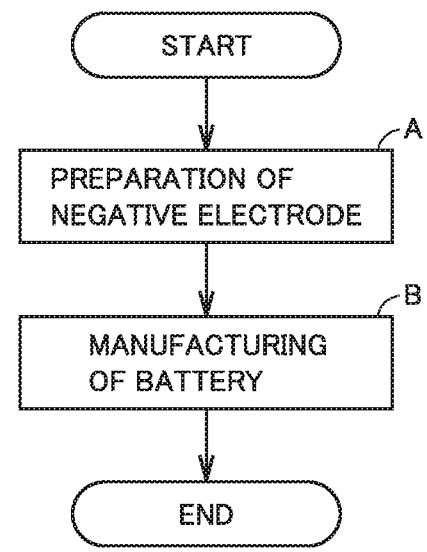
FIG. 5 is a flowchart showing overview of a method of manufacturing a lithium ion secondary battery in the present embodiment.

FIG. 5 is a flowchart showing overview of a method of manufacturing a lithium ion secondary battery in the present embodiment. The method of manufacturing a battery in the present embodiment includes "[A] preparation of negative electrode" and "[B] manufacturing of battery."

<<[A] Preparation of Negative Electrode>>

The method of manufacturing a battery in the present embodiment includes preparing a negative electrode manufactured with a method of manufacturing a negative electrode in the present embodiment.

Figure 6:
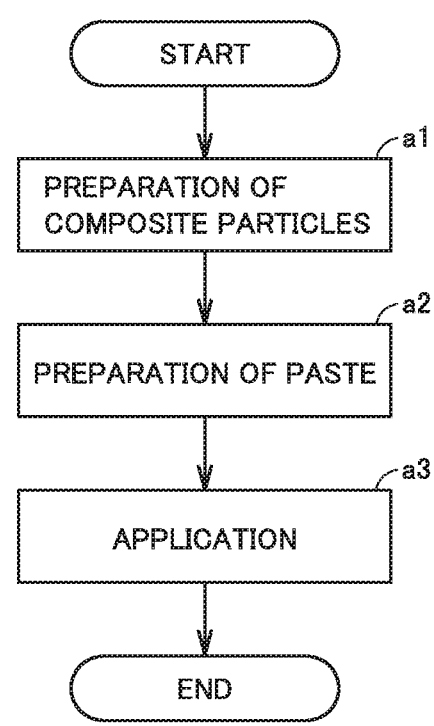
FIG. 6 is a flowchart showing overview of a method of manufacturing a negative electrode in the present embodiment.

FIG. 6 is a flowchart showing overview of the method of manufacturing a negative electrode in the present embodiment. The method of manufacturing a negative electrode in the present embodiment includes "[a1] preparation of composite particles," "[a2] preparation of paste," and "[a3] application".

([a1] Preparation of Composite Particles)

The method of manufacturing a negative electrode in the present embodiment includes preparing composite particles 20 by forming coating 22 on a surface of negative electrode active material particle 21. Coating 22 is formed to contain a reaction product of aromatic dicarboxylic acid and lithium hydroxide.

Aromatic dicarboxylic acid is prepared. In aromatic dicarboxylic acid, two carboxy groups satisfy para-positional relation. Aromatic dicarboxylic acid may be, for example, aromatic dicarboxylic acid expressed with any of formulae (VI) to (IX) below.

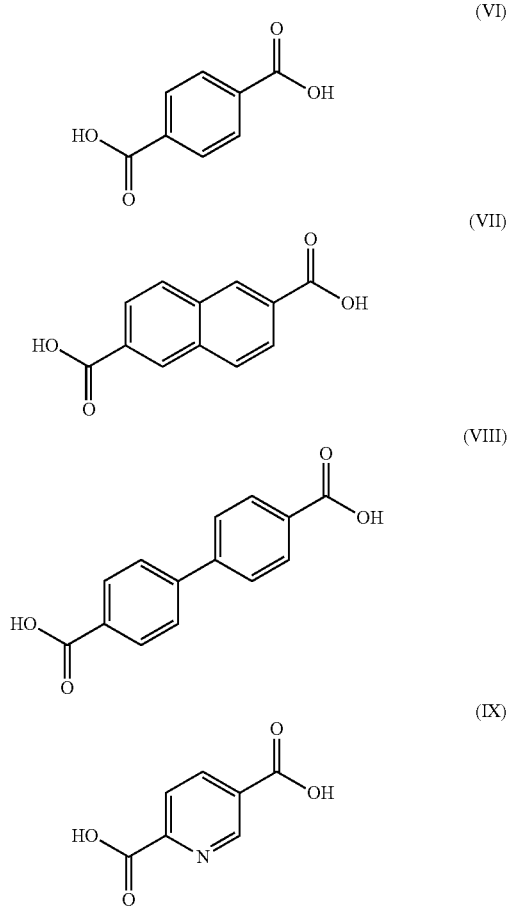

Lithium hydroxide may be, for example, a hydrate. For example, lithium hydroxide 1-hydrate is dissolved in pure water. An aqueous solution is thus prepared. Aromatic dicarboxylic acid is mixed in the aqueous solution. A ratio of mixing is set, for example, to "aromatic dicarboxylic acid:lithium hydroxide 1-hydrate=1:2 (at a molar ratio)." The aqueous solution is agitated around 100° C. under reflux. After agitation, water in the aqueous solution is removed by an evaporator. The reaction product of aromatic dicarboxylic acid and lithium hydroxide is thus obtained. The product is considered as the MOF described previously.

Negative electrode active material particles 21 are prepared. Details of negative electrode active material particles 21 are as described previously. For example, negative electrode active material particles 21 and the MOF are agitated in pure water. A dispersion liquid is thus prepared. The dispersion liquid is agitated around 100° C. under reflux. The MOF is thus considered to adhere to the surface of negative electrode active material particle 21. After agitation, water in the dispersion liquid is removed by an evaporator. Coating 22 can be formed on the surface of negative electrode active material particle 21 as set forth above. Namely, composite particles 20 can be formed. Coating 22 is considered to contain a reaction product of aromatic dicarboxylic acid and lithium hydroxide (MOF).

The coating may be formed to further contain LTO particles. For example, the coating containing the LTO particles can be formed by attaching LTO particles to the surface of negative electrode active material particle 21 with a mechanochemical method.

The MOF and the LTO particles are desirably sequentially attached to the surface of negative electrode active material particle 21. For example, the MOF may be attached to the surface of negative electrode active material particle 21 and thereafter the LTO particles may be attached to the surface. It is thus expected that a portion where the MOF is missing can be covered by the LTO particles. For example, the LTO particles may be attached to the surface of negative electrode active material particle 21 and thereafter the MOF may be attached to the surface. It is thus expected that a portion where the LTO particles are missing can be covered by the MOF.

As the MOF and the LTO particles mutually cover a loss, suppression of exposure of negative electrode active material particles 21 in composite particles 20 is expected. Further suppression of propagation of a short-circuit current is expected owing to suppression of exposure of negative electrode active material particles 21.

It is considered that, as a result of coverage for a loss of the MOF and the LTO particles by each other, a portion where negative electrode active material particles 21 are in contact with each other with the MOF being interposed and a portion where negative electrode active material particles 21 are in contact with each other with the LTO particles being interposed are formed in negative electrode composite material layer 202. It is thus expected that both of a high resistance at the time of short-circuiting and a low resistance in normal use are achieved.

([a2] Preparation of Paste)

The method of manufacturing a negative electrode in the present embodiment includes preparing a paste containing at least composite particles 20 and an organic solvent.

For example, a paste can be prepared by mixing composite particles 20, an organic solvent based binder, and an organic solvent. Details of the organic solvent based binder are as described previously. The organic solvent may be, for example, N-methyl-2-pyrrolidone (NMP), tetrahydrofuran (THF), dimethylformamide (DMF), methyl ethyl ketone (MEK), or dimethyl sulfoxide (DMSO).

In general, for a paste for forming negative electrode composite material layer 202, water is used as the solvent and a water based binder (CMC or SBR) is used as the binder. In the present embodiment, however, when water is used as the solvent for the paste, the MOF may come off from the surface of the negative electrode active material particle. Then, it may be difficult to maintain coating 22 in negative electrode composite material layer 202.

For example, the paste may be prepared by mixing composite particles 20, ITO particles, an organic solvent based binder, and an organic solvent. The paste may be prepared to further contain the LTO particles. In negative electrode composite material layer 202 formed with the paste, the LTO particles are dispersed in negative electrode composite material layer 202. It is thus expected that increase in resistance in normal use is suppressed.

([a3] Application)

The method of manufacturing a negative electrode in the present embodiment includes manufacturing negative electrode 200 by applying the paste to a surface of negative electrode current collector 201 and drying the paste.

Negative electrode current collector 201 is prepared. Details of negative electrode current collector 201 are as described previously. The paste is applied to the surface of negative electrode current collector 201 and dried so that negative electrode composite material layer 202 can be formed. Negative electrode 200 can thus be manufactured.

Negative electrode composite material layer 202 may be rolled. Negative electrode 200 may be cut into a prescribed two-dimensional shape.

<<[B] Manufacturing of Battery>>

The method of manufacturing a battery in the present embodiment includes manufacturing battery 1000 including at least negative electrode 200 and positive electrode 100.

Positive electrode 100 and separator 300 are prepared. Details of positive electrode 100 and separator 300 are as described previously. The method of manufacturing positive electrode 100 and separator 300 should not particularly be limited. Positive electrode 100 and separator 300 can be prepared with a conventionally known method.

For example, electrode group 500 can be made by stacking positive electrode 100, separator 300, and negative electrode 200 with separator 300 being interposed between positive electrode 100 and negative electrode 200. Case 1001 and an electrolyte solution are prepared. Details of case 1001 and the electrolyte solution are as described previously. Electrode group 500 and the electrolyte solution are accommodated in case 1001. Case 1001 is hermetically sealed. Electrode group 500 is impregnated with the electrolyte solution. Battery 1000 can be manufactured as above.

<Application of Lithium Ion Secondary Battery>

Suppression of propagation of a short-circuit current at the time when positive electrode 100 and negative electrode 200 are short-circuited to each other is expected in battery 1000 in the present embodiment. Such characteristics are suitable for a high-capacity battery where a high short-circuit current may be produced. Examples of a high-capacity battery include a power supply for driving for a hybrid vehicle (HV), a plug-in hybrid vehicle (PHV), an electric vehicle (EV), and the like. Applications of battery 1000 in the present embodiment should not be limited to car-mounted applications. Battery 1000 in the present embodiment can be applied to each and every application.

EXAMPLES

Examples will be described below. The description below does not limit the scope of claims.

Example 1

1. [A] Preparation of Negative Electrode
1-1. [a1] Preparation of Composite Particles As aromatic dicarboxylic acid, 2,6-naphthalenedicarboxylate was prepared, which is expressed in the formula (VII).

Lithium hydroxide 1-hydrate was dissolved in pure water. An aqueous solution was thus prepared. In the aqueous solution, 2,6-naphthalenedicarboxylate was mixed. A ratio of mixing was set to "2,6-naphthalenedicarboxylate:lithium hydroxide 1-hydrate=1:2 (at a molar ratio)" The aqueous solution was agitated for one hour at 100° C. under reflux. Water was removed by an evaporator. A reaction product of 2,6-naphthalenedicarboxylate and lithium hydroxide was thus obtained. The product was dried in vacuum at 110° C.

The obtained product is considered as the MOF. The MOF is considered to be formed by alternately stacking a first layer and a second layer. The first layer is considered to be formed by stacking an aromatic compound expressed in the formula (II). The second layer is considered to be formed by Li ions coordinated to a carboxylate anion in the first layer.

Negative electrode active material particles having an average particle size of 15 μm were prepared. The negative electrode active material particles were such that spheroidized natural graphite was coated with low-crystalline carbon.

The negative electrode active material particles and the MOF were agitated in pure water. A dispersion liquid was thus prepared. A ratio of mixing was set to "negative electrode active material particles:MOF=98:2 (at a mass ratio)." The dispersion liquid was agitated for one hour at 100° C. under reflux. A coating was thus formed on a surface of the negative electrode active material particle. Water was removed by an evaporator. A solid was thus obtained. The solid was dried in vacuum at 110° C.

"First composite particles" were prepared as above. The first composite particles contained negative electrode active material particles and the coating. The coating was formed on the surface of the negative electrode active material particle. The coating was considered to contain the MOF (a reaction product of 2,6-naphthalenedicarboxylate and lithium hydroxide).

1-2. [a2] Preparation of Paste

Materials below were prepared.

First composite particles (prepared above)
Binder: PVdF (organic solvent based binder)
Solvent. NMP (organic solvent)
Negative electrode current collector: Cu foil A paste was prepared by mixing the first composite particles, the binder, and the solvent. The paste containing at least the composite particles and the organic solvent was prepared. A ratio of mixing was set to "first composite particles:binder=100.5:2 (at a mass ratio)."

1-3. [a3] Application

The paste was applied to the surface of the negative electrode current collector and dried. The negative electrode composite material layer was thus formed. The negative electrode composite material layer had a weight per unit area of 6.15 mg/cm$^2$ on one surface (12.3 mg/cm$^2$ on both surfaces). The negative electrode composite material layer was rolled. The negative electrode was manufactured as set forth above.

2. [B] Manufacturing of Battery
2-1. Preparation of Positive Electrode

Materials below were prepared
Positive electrode active material particles: $LiNi_{1/3}Co_{1/3}Mn_{1/3}O_2$
Conductive material: acetylene black
Binder: PVdF
Solvent: NMP
Positive electrode current collector: Al foil A paste was prepared by mixing the positive electrode active material particles, the conductive material, the binder, and the solvent. A ratio of mixing was set to "positive electrode active material particles:conductive material: binder=93:5:2 (at a mass ratio)." The paste was applied to surfaces (both of a front surface and a rear surface) of the positive electrode current collector and dried. A positive electrode composite material layer was thus formed. The positive electrode composite material layer had a weight per unit area of 13 mg/cm² on one surface (26 mg/cm² on both surfaces). The positive electrode composite material layer was rolled. The positive electrode was prepared as set forth above.

2-2. Preparation of Separator

Materials below were prepared.

Filler: alumina

Binder: CMC and ethylene-acrylic acid ester copolymer

Solvent: water

Substrate: porous film (having a thickness of 20 μm and a three-layered structure of PP layer/PE layer/PP layer)

A paste was prepared by mixing the filler, the binder, and the solvent. A ratio of mixing was set to "filler:binder=95:5 (at a mass ratio)." CMC and the ethylene-acrylic acid ester copolymer were prepared in equal proportions. A heat-resistant layer was formed by applying the paste to a surface (one surface) of a substrate and drying the paste. The heat-resistant layer had a weight per unit area of 0.75 mg/cm². The separator was prepared as above.

2-3. Assembly

The positive electrode, the separator, and the negative electrode were stacked with the separator being interposed between the positive electrode and the negative electrode. An electrode group was thus made up. A prescribed case and an electrolyte solution were prepared. The case accommodated the electrode group and the electrolyte solution. The electrolyte solution was composed as below.

Li salt: 1.1 mol/l of $LiPF_6$

Solvent: [EC:EMC:DMC=3:3:4 (at a volume ratio)]

2-4. Charging and Aging

The case was hermetically sealed. The electrode group was sufficiently impregnated with the electrolyte solution. A battery (lithium ion secondary battery) including the negative electrode and the positive electrode was manufactured as set forth above. The battery was designed to have a prescribed rated capacity within a range from 3.0 to 4.1 V. A state of charge (SOC) of the battery was adjusted to 100% in first charging. The battery was stored for twenty-four hours in an environment at 60° C. In the present experiment, a state after storage for twenty-four hours is defined as an initial state.

Example 2

The battery was manufactured and set to the initial state as in Example 1 except for change in composition and weight per unit area of the negative electrode composite material layer as shown in Table 1 below.

Example 3

$Li_4Ti_5O_{12}$ (having an average particle size of 0.7 μm and spinel type crystal structure) was prepared as the LTO particles. A paste was prepared by mixing the first composite particles, the LTO particles, the binder, and the solvent. The paste was prepared to further contain the LTO particles.

A negative electrode composite material layer was formed by applying the paste to a surface of the negative electrode current collector and drying the paste. Table 1 below shows a composition and a weight per unit area of the negative electrode composite material layer. A battery was manufactured and set to the initial state as in Example 1 except for the above Example 3 is an example in which the negative electrode further contained the LTO particles in addition to the composite particles.

Example 4

The negative electrode active material particles and the LTO particles were mixed for ten minutes in a ball mill. A ratio of mixing was set to "negative electrode active material particles:LTO particles=98:2.5 (at a mass ratio)." "Second composite particles" were thus prepared. The second composite particles contained negative electrode active material particles and a coating. The coating was formed on the surface of the negative electrode active material particle. The coating was considered to contain the LTO particles.

The second composite particles and the MOF were agitated in pure water. A dispersion liquid was thus prepared. A ratio of mixing was set to "second composite particles:MOF=100.5:2.5 (at a mass ratio). The dispersion liquid was agitated for one hour at 100° C. under reflux. Water was removed by an evaporator. A solid was thus obtained. The solid was dried in vacuum at 110° C.

"Third composite particles" were prepared as above. The third composite particles contained negative electrode active material particles and a coating. The coating was formed on the surface of the negative electrode active material particle. The coating was considered to further contain LTO particles in addition to the MOF.

A negative electrode composite material layer was formed as in Example 1 except for use of the third composite particles instead of the first composite particles. Table 1 below shows a composition and a weight per unit area of the negative electrode composite material layer. A battery was manufactured and set to the initial state as in Example 1 except for the above.

Example 5

The first composite particles and the LTO particles were mixed for ten minutes in a ball mill. A ratio of mixing was set to "first composite particles:LTO particles=103:2 (at a mass ratio)." "Fourth composite particles" were thus prepared. The fourth composite particles contained negative electrode active material particles and a coating. The coating was formed on the surface of the negative electrode active material particle. The coating was considered to further contain LTO particles in addition to the MOF. A difference between the third composite particles (described previously) and the fourth composite particles resides in an order of attachment of the MOF and the LTO particles to the surface of the negative electrode active material particle.

A negative electrode composite material layer was formed as in Example 1 except for use of the fourth composite particles instead of the first composite particles. Table 1 below shows a composition and a weight per unit area of the negative electrode composite material layer. A battery was manufactured and set to the initial state as in Example 1 except for the above.

Comparative Example 1

A negative electrode composite material layer was formed as in Example 1 except for use of untreated negative electrode active material particles instead of the first composite particles. Table 1 below shows a composition and a weight per unit area of the negative electrode composite material layer. A battery was manufactured and set to the initial state as in Example 1 except for the above. Comparative Example 1 is an example in which no coating was formed on the surface of the negative electrode active material particle.

Comparative Example 2

A negative electrode composite material layer was formed as in Example 3 except for use of untreated negative electrode active material particles instead of the first composite particles. Table 1 below shows a composition and a weight per unit area of the negative electrode composite material layer. A battery was manufactured and set to the initial state as in Example 1 except for the above. Comparative Example 2 is an example in which no coating was formed on the surface of the negative electrode active material particle.

Comparative Example 3

A battery was manufactured and set to the initial state as in Comparative Example 2 except for change in composition and weight per unit area of the negative electrode composite material layer as shown in Table 1 below. Comparative Example 3 is an example in which no coating was formed on the surface of the negative electrode active material particle.

Comparative Example 4

A negative electrode composite material layer was formed as in Example 1 except for use of the second composite particles instead of the first composite particles. Table 1 below shows a composition and a weight per unit area of the negative electrode composite material layer. A battery was manufactured and set to the initial state as in Example 1 except for the above. Comparative Example 4 is an example in which the coating contained no MOF.

Comparative Example 5

A battery was manufactured and set to the initial state as in Comparative Example 4 except for change in composition and weight per unit area of the negative electrode composite material layer as shown in Table 1 below. Comparative Example 5 is an example in which the coating contained no MOF.

Comparative Example 6

A paste was prepared by mixing the negative electrode active material particles, the MOF, the binder, and the solvent. A ratio of mixing was set to "negative electrode active material particles:MOF:binder=98:2.5:2 (at a mass ratio)." A negative electrode composite material layer was formed by applying the paste to the surface of the negative electrode current collector and drying the paste. Table 1 below shows a composition and a weight per unit area of the negative electrode composite material layer. A battery was manufactured and set to the initial state as in Example 1 except for the above. Comparative Example 6 is an example in which no coating was formed on the surface of the negative electrode active material particle and the MOF was dispersed in the negative electrode composite material layer.

Comparative Example 7

A battery was manufactured and set to the initial state as in Comparative Example 6 except for change in composition and weight per unit area of the negative electrode composite material layer as shown in Table 1 below. Comparative Example 7 is an example in which no coating was formed on the surface of the negative electrode active material particle and the MOF was dispersed in the negative electrode composite material layer.

Comparative Example 8

A paste was prepared by mixing the second composite particles, the MOF, and the binder. A ratio of mixing was set to "second composite particles:MOF:binder=100.5:2.5:2." A negative electrode composite material layer was formed by applying the paste to the surface of the negative electrode current collector and drying the paste. Table 1 below shows a composition and a weight per unit area of the negative electrode composite material layer. A battery was manufactured and set to the initial state as in Example 1 except for the above. Comparative Example 8 is an example in which the coating contained no MOF and the MOF was dispersed in the negative electrode composite material layer.

<Evaluation>

<<Test by Nailing>>

The battery was charged with a constant current-constant voltage (CCCV) method. A current during charging with a constant current (CC) was set to 1 C. "1 C" refers to a rate of a current with which a rated capacity is discharged in one hour. A voltage during charging with a constant voltage (CV) was set to 4.1 V. A total time period for charging was set to two hours.

After charging, a nail was driven into the battery. The nail corresponds to a conductive foreign matter. An amount of lowering in voltage ten seconds after the nail was driven into the battery was measured. Table 1 shows results. It is considered that propagation of a short-circuit current is suppressed as an amount of lowering in voltage is smaller.

<<Reaction Resistance>>

An SOC of the battery was adjusted to 50%. In an environment at −10° C., a reaction resistance was measured with an alternating-current impedance method. Table 1 shows results. A value shown in the field of reaction resistance in Table 1 is obtained by dividing a reaction resistance in each example by a reaction resistance in Comparative Example 1. As the value is smaller, a resistance in normal use is considered as being lower.

TABLE 1

List of Examples and Comparative Examples

| | Negative Electrode | | | | | | Evaluation | |
|---|---|---|---|---|---|---|---|---|
| | Composition of Negative Electrode Composite Material Layer | | | | | | Test by Nailing | |
| | Composite Particles | | | Others (Dispersed in Negative Electrode Composite Material Layer) | | | Amount of | AC Impedance |
| | Negative Electrode | Coating | | | | | | |
| | Active Material Particles Mass % | MOF Mass % | LTO Particles Mass % | MOF Mass % | LTO Particles Mass % | Binder Mass % | Weight per Unit Area mg/cm$^2$ | Voltage Lowering V | Reaction Resistance % |
| Comparative Example 1 | 98.0 | 0 | 0 | 0 | 0 | 2.0 | 6.00 | 4.1 | 100 |
| Comparative Example 2 | 95.6 | 0 | 0 | 0 | 2.4 | 2.0 | 6.15 | 4.1 | 100 |
| Comparative Example 3 | 93.3 | 0 | 0 | 0 | 4.8 | 1.9 | 6.30 | 4.1 | 100 |
| Comparative Example 4 | 95.6 | 0 | 2.4 | 0 | 0 | 2.0 | 6.15 | 3.2 | 99 |
| Comparative Example 5 | 93.3 | 0 | 4.8 | 0 | 0 | 1.9 | 6.30 | 3.0 | 98 |
| Comparative Example 6 | 95.6 | 0 | 0.0 | 2.4 | 0 | 2.0 | 6.15 | 4.1 | 110 |
| Comparative Example 7 | 93.3 | 0 | 0.0 | 4.8 | 0 | 1.9 | 6.30 | 4.1 | 121 |
| Comparative Example 8 | 93.3 | 0 | 2.4 | 2.4 | 0 | 1.9 | 6.30 | 3.0 | 105 |
| Example 1 | 95.6 | 2.4 | 0.0 | 0.0 | 0 | 2.0 | 6.15 | 1.0 | 170 |
| Example 2 | 93.3 | 4.8 | 0.0 | 0.0 | 0 | 1.9 | 6.30 | 0.9 | 200 |
| Example 3 | 93.3 | 2.4 | 0.0 | 0.0 | 2.4 | 1.9 | 6.30 | 1.0 | 130 |
| Example 4*[1] | 93.3 | 2.4 | 2.4 | 0.0 | 0 | 1.9 | 6.30 | 0.4 | 96 |
| Example 5*[2] | 93.3 | 2.4 | 2.4 | 0.0 | 0 | 1.9 | 6.30 | 0.5 | 95 |

*[1] A coating was formed by attachment of the LTO particles and the MOF to the surface of the negative electrode active material particle in this order.
*[2] A coating was formed by attachment of the MOF and the LTO particles to the surface of the negative electrode active material particle in this order.

<Result>

As shown in Table 1, propagation of a short-circuit current is suppressed in Examples 1 to 5. It is considered that propagation of the short-circuit current through a point of contact between the negative electrode active material particles is suppressed by containing the MOF in the coating.

Propagation of the short-circuit current is not suppressed in Comparative Examples 1 to 3. It is considered that the short-circuit current propagated through the negative electrode active material particles because no coating was formed on the surface of the negative electrode active material particle.

Propagation of the short-circuit current was not sufficiently suppressed in Comparative Examples 4 and 5. It is considered that an electrical resistance did not sufficiently increase at the time of short-circuiting in the coating containing only the LTO particles.

Propagation of the short-circuit current was not suppressed in Comparative Examples 6 and 7. It is considered that the MOF dispersed in the negative electrode composite material layer was unable to suppress propagation of the short-circuit current through the negative electrode active material particles.

Propagation of the short-circuit current was not sufficiently suppressed in Comparative Example 8 It is considered that an electrical resistance of the coating containing only the LTO particles did not sufficiently increase and the MOF dispersed in the negative electrode composite material layer was unable to suppress propagation of the short-circuit current.

The negative electrode further contained the LTO particles in Example 3. Increase in resistance during normal use was suppressed more in Example 3 than in Examples 1 and 2.

In Examples 4 and 5, the coating contained both of the MOF and the LTO particles. Propagation of the short-circuit current was suppressed more in Examples 4 and 5 than in Examples 1 to 3. A resistance during normal use was suppressed more in Examples 4 and 5 than in Comparative Examples 1 to 8.

Though an embodiment of the present disclosure has been described, it should be understood that the embodiment disclosed herein is illustrative and non-restrictive in every respect. The technical scope defined by the terms of the claims is intended to include any modifications within the scope and meaning equivalent to the terms of the claims.

What is claimed is:

1. A negative electrode comprising at least composite particles,
   the composite particles each containing a negative electrode active material particle and a coating,
   the coating being formed on a surface of the negative electrode active material particle,
   the coating containing lithium-containing titanium oxide particles and at least a metal organic framework,
   the metal organic framework being formed by alternately stacking a first layer and a second layer,
   the first layer being formed by stacking an aromatic compound in a direction intersecting with a direction of stack of the first layer and the second layer, the aromatic compound containing two carboxylate anions, the two carboxylate anions satisfying para-positional relation, and the second layer being formed of lithium ions coordinated to the carboxylate anion.

2. The negative electrode according to claim 1, further comprises a negative electrode composite material layer, and the negative electrode composite material layer contains 70 to 90 mass % of the negative electrode active material particle, 1 to 10 mass % of the metal organic framework and 1 to 10 mass % of the lithium-containing titanium oxide particles.

3. The negative electrode according to claim 1, further comprises a negative electrode composite material layer, the negative electrode composite material layer contains 93.3 to 95.6 mass % of the negative electrode active material particle, and the negative electrode composite material layer contains 2.4 to 4.8 mass % in total of the metal organic framework and the lithium-containing titanium oxide particles.

4. A lithium ion secondary battery comprising at least:

the negative electrode according to claim 1; and a positive electrode.

* * * * *